United States Patent
Sebben et al.

(10) Patent No.: US 9,751,685 B2
(45) Date of Patent: Sep. 5, 2017

(54) EXTENDING AND SEPARATING ELEMENT FOR PACKAGING

(71) Applicant: Jofund S/A, Joinville-Santa Catarina (BR)

(72) Inventors: Marcos Alexandre Boettcher Sebben, Joinville-Santa Catarina (BR); Frederico Prates Vericimo, Joinville-Santa Catarina (BR)

(73) Assignee: JOFUND S/A, Santa Catarina (BR)

( * ) Notice: Subject to any disclaimer, the term of this patent is extended or adjusted under 35 U.S.C. 154(b) by 0 days.

(21) Appl. No.: 14/747,725

(22) Filed: Jun. 23, 2015

(65) Prior Publication Data

US 2016/0332801 A1 Nov. 17, 2016

(30) Foreign Application Priority Data

May 15, 2015 (BR) .......................... 1020150112866

(51) Int. Cl.
| | |
|---|---|
| *B65D 85/02* | (2006.01) |
| *B65G 57/00* | (2006.01) |
| *B65D 21/02* | (2006.01) |
| *B65D 21/08* | (2006.01) |
| *B65D 25/10* | (2006.01) |
| *B65D 85/58* | (2006.01) |
| *A47F 7/04* | (2006.01) |

(52) U.S. Cl.
CPC ......... *B65D 85/02* (2013.01); *B65D 21/0228* (2013.01); *B65D 21/083* (2013.01); *B65D 25/10* (2013.01); *B65D 85/58* (2013.01); *B65G 57/005* (2013.01); *A47F 7/04* (2013.01); *B65D 2571/00043* (2013.01)

(58) Field of Classification Search
CPC ............ B65D 21/0217; B65D 21/0809; B65D 2585/6882; B65D 2585/6875; B65D 57/00; B65D 71/70; B65D 85/02; B65D 21/0209; B65D 71/0088; B65D 2571/00043; B65D 2571/00049; H01L 21/67303; G11B 33/0461; G11B 33/0472; G11B 33/0466; G11B 33/0433; B65G 57/005; A47F 7/04
USPC ....... 206/303, 397, 394, 710, 712; 220/4.07, 220/4.06, 4.27
See application file for complete search history.

(56) References Cited

U.S. PATENT DOCUMENTS

| | | | | |
|---|---|---|---|---|
| 2,957,601 | A | * | 10/1960 | Novick .............. B65D 21/0224 206/503 |
| 3,180,537 | A | * | 4/1965 | Collins ................ B65D 47/265 206/501 |

(Continued)

*Primary Examiner* — Anthony Stashick
*Assistant Examiner* — Mollie Impink

(57) ABSTRACT

The present invention refers to an extending and separating element (1) to be used in packaging, particularly packaging for automotive parts, such as brake disks and/or drums, clutch disk, wheel hub, or any other parts of similar formats for automotive vehicles. The extending and separating element (1) is intended to be connectable between the base (B) and a cover (T) of packaging (E), so as to allow the appropriate placing of two parts (P) in the same packaging, and provide structural advantages for the aforesaid packaging (E) when assembled. The aforesaid extending and separating element (1) is formed of an intermediary disk (2), which separates a first ring projection (3) from a second ring projection (4), configured to receive the base (B) and the cover (T).

2 Claims, 3 Drawing Sheets

(56) References Cited

U.S. PATENT DOCUMENTS

| | | | | |
|---|---|---|---|---|
| 5,385,326 | A | * | 1/1995 | Bidwell ................ A47G 23/03 220/4.26 |
| 5,671,856 | A | * | 9/1997 | Lisch .................... A01K 97/06 206/519 |
| 5,722,540 | A | * | 3/1998 | Laird ................ B65D 21/0224 206/503 |
| 7,128,230 | B2 | * | 10/2006 | Jacobson ................ A47J 31/50 206/508 |
| 2007/0138037 | A1 | * | 6/2007 | Hasenbusch ........... B65D 57/00 206/303 |

* cited by examiner

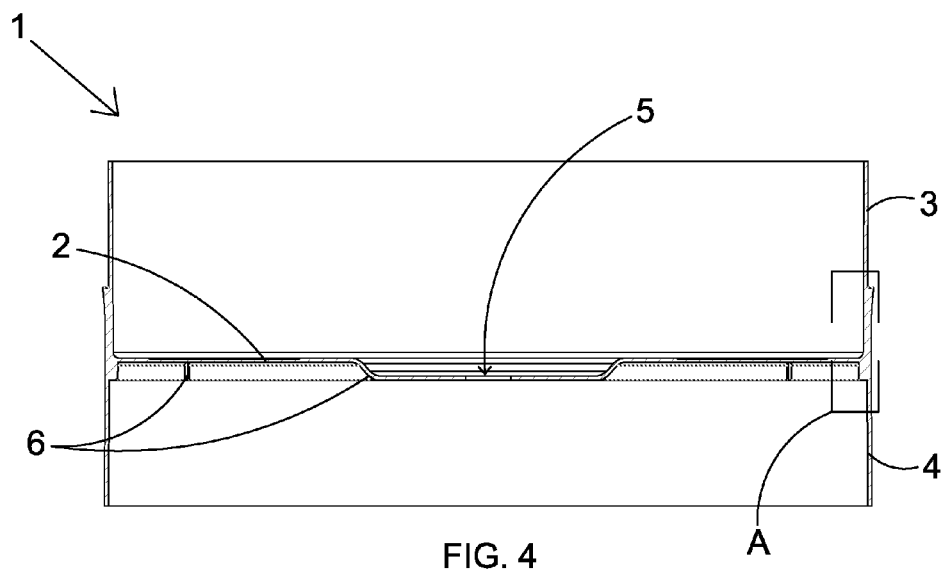
FIG. 4
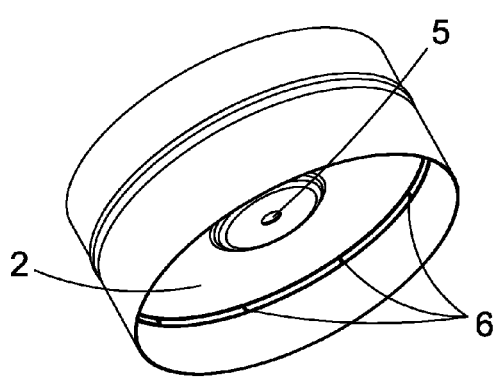
FIG. 5
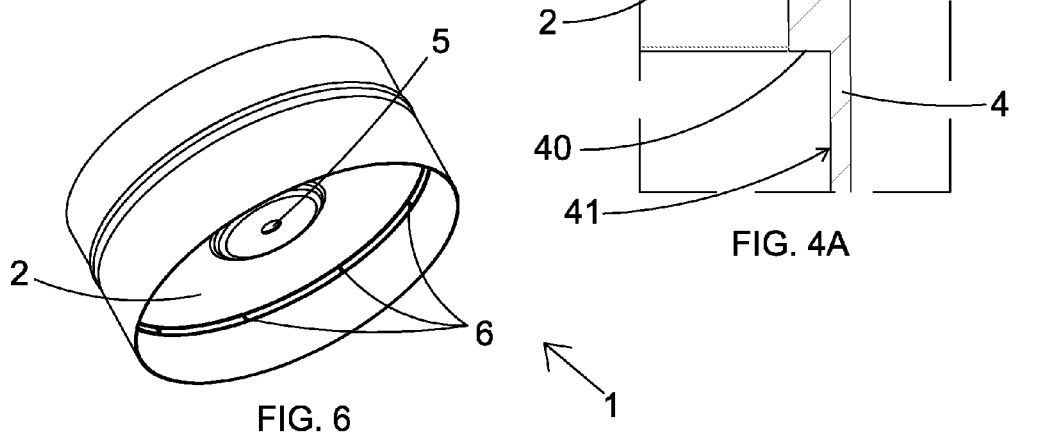
FIG. 4A
FIG. 6

EXTENDING AND SEPARATING ELEMENT FOR PACKAGING

The present invention refers to an extending and separating element to be used in packaging, particularly packaging for automotive parts, such as brake disks and/or drums, clutch disk, wheel hub, or any others of similar formats for automotive vehicles. Such extending and separating element is intended to be connectable between the base and cover of packaging, so as to allow the appropriate placing of two parts in the same packaging, and provide structural advantages for this packaging.

BACKGROUND

A technical person knows about packaging for storing automotive parts, such as brake disks and/or drums, clutch disks, for automotive vehicles, mainly to protect them against external agents, contacts with other objects and facilitate their transportation, as it concerns automotive components made of high density materials, resulting in heavy parts, which exercise a great deal of force against the walls of their packaging, having to offer sufficient mechanical resistance for the transportation and stacking of the packaging.

As an example of this packaging, we can mention Brazilian patent document MU7701997-0, filed on Jul. 31, 1997, originally entitled "ARRANGEMENT APPLIED IN PACKAGING FOR BRAKE DISKS", which described packaging endowed with a cover and base, which can be coupled together so as to allow parts to be stored inside. However, one of the disadvantages of this packaging lies in the fact that it lacks structural elements which give it greater resistance. Thus, it is necessary to use a large quantity of material to manufacture each item of packaging, in order for it to have mechanical resistance to handle the automotive parts maintained inside it.

Aiming at resolving these unsatisfactory aspects the applicant developed a product concept, object of Brazilian patent application BR 10 2015 007398 4, filed on Apr. 7, 2015, entitled "PACKAGING WITH AIR PRESSURE RELIEF VALVE", which presents packaging that, among other advantages, has structural features capable of providing greater mechanical resistance, allowing the stacking and transportation of this packaging with greater safety, also reducing the quantity of material required to produce each item of packaging, when compared with other existing packaging.

However, for greater protection of the parts transported, they are individually insulated with suitable material to absorb impact forces, such as bubble wrap, cardboard, polystyrene or suchlike. Such insulation is necessary to avoid the parts contained inside each item of packaging undergoing damage from hitting each other.

Thus, in an inappropriate manner, this packaging uses a greater amount of raw material and labor, to protect the parts inside it, as each part needs to be insulated separately, by suitable material as mentioned beforehand, leading to reduced efficiency in the production process and increased total product cost.

Another disadvantage of this packaging is the physical space occupied by such protection material inside the packaging, resulting from the requirement to use packaging of larger dimensions, which is capable of housing simultaneously the parts and their protective material. Thus, there also occurs an increase in the inventory and transportation costs of this packaging, due to the greater volume required.

Thus, despite the advances introduced in the packaging with the air pressure relief valve proposed by Brazilian patent application BR 10 2015 007398 4, the applicant, continuing with its studies regarding the issue, perceived the need to develop an extending and separating element for packaging, which is designed to be connectable between the packaging base and cover, being endowed with a central disk capable of physically separating the parts to be stored inside the packaging, preventing blows occurring when it is moved.

Thus, an objective of the present invention is to provide an extending and separating element for packaging capable of avoiding parts arranged inside the packaging hitting each other, thereby dispensing with the requirement for individual insulation of each one of the parts.

Advantageously, the extending and separating element for packaging dispenses with the use of other protection materials for individual insulation of the parts arranged inside the packaging, leading to production and logistical gains of the end product.

Another objective of the present invention, besides allowing suitable arrangement of two parts in the same packaging, is to offer greater mechanical resistance to the assembled unit, base, extending and separating element, allowing the stacking and transportation of this packaging with greater safety.

BRIEF DESCRIPTION OF THE INVENTION

In a condensed way, the present invention describes an extending and separating element formed by an intermediary disk, which separates two ring projections, such extending and separating element being intended to be connectable between an item of packaging cover and base, to separate the parts arranged inside the aforesaid packaging. The ring projections are positioned in the peripheral region of the aforesaid intermediary disk, in a manner so that such ring projections are laid out one against the other.

Moreover, the ring projections are endowed with support regions, the first support region being preferably arranged on the outer surface of the first ring projection, while the second support region is arranged on the inner surface of the second ring projection. Thus, in a preferable example of application of the present invention, the extending and separating element is fitted between the packaging cover and base, so that the first ring projection is positioned inside the cover wall, while the second ring projection is positioned outside the base wall.

Schematic figures are presented below of a particular execution of the invention, whose dimensions and proportions are not necessarily real, as the figures only have the purpose of presenting didactically their various aspects, whose protection scope is established only by the scope of the claims attached.

DESCRIPTION OF THE DRAWINGS

FIG. 4 illustrates a cross-section view of the extending and separating element (1);

FIG. 4A illustrates a magnified view of detail "A" of FIG. 4;

FIG. 5 illustrates an upper view of the extending and separating element (1); and FIG. 6 illustrates a view in lower perspective of the extending and separating element (1).

DESCRIPTION OF THE INVENTION

Figure 1:
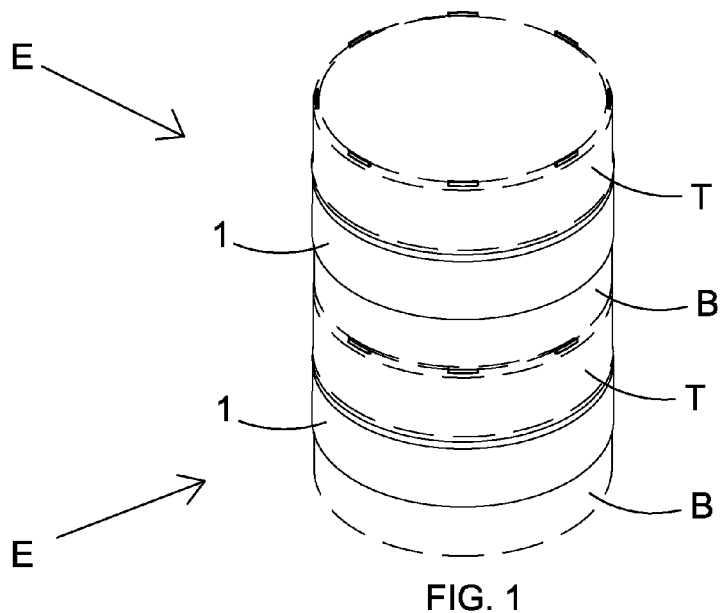
FIG. 1 illustrates a view in perspective of two stacked items of packaging (E), both assembled with the extending and separating element (1) coupled.
Figure 2:
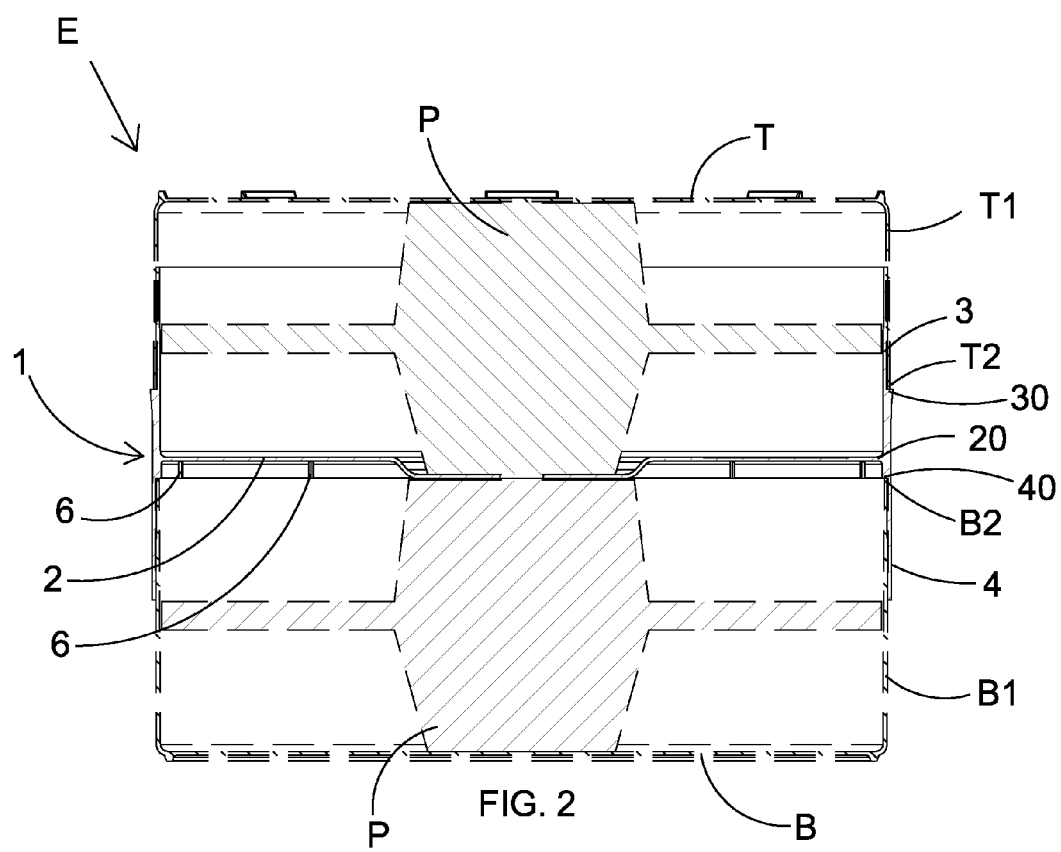
FIG. 2 illustrates a cross-section view of an item of packaging (E) assembled with the extending and separating element (1) and endowed with two automotive parts (P)
Figure 3:
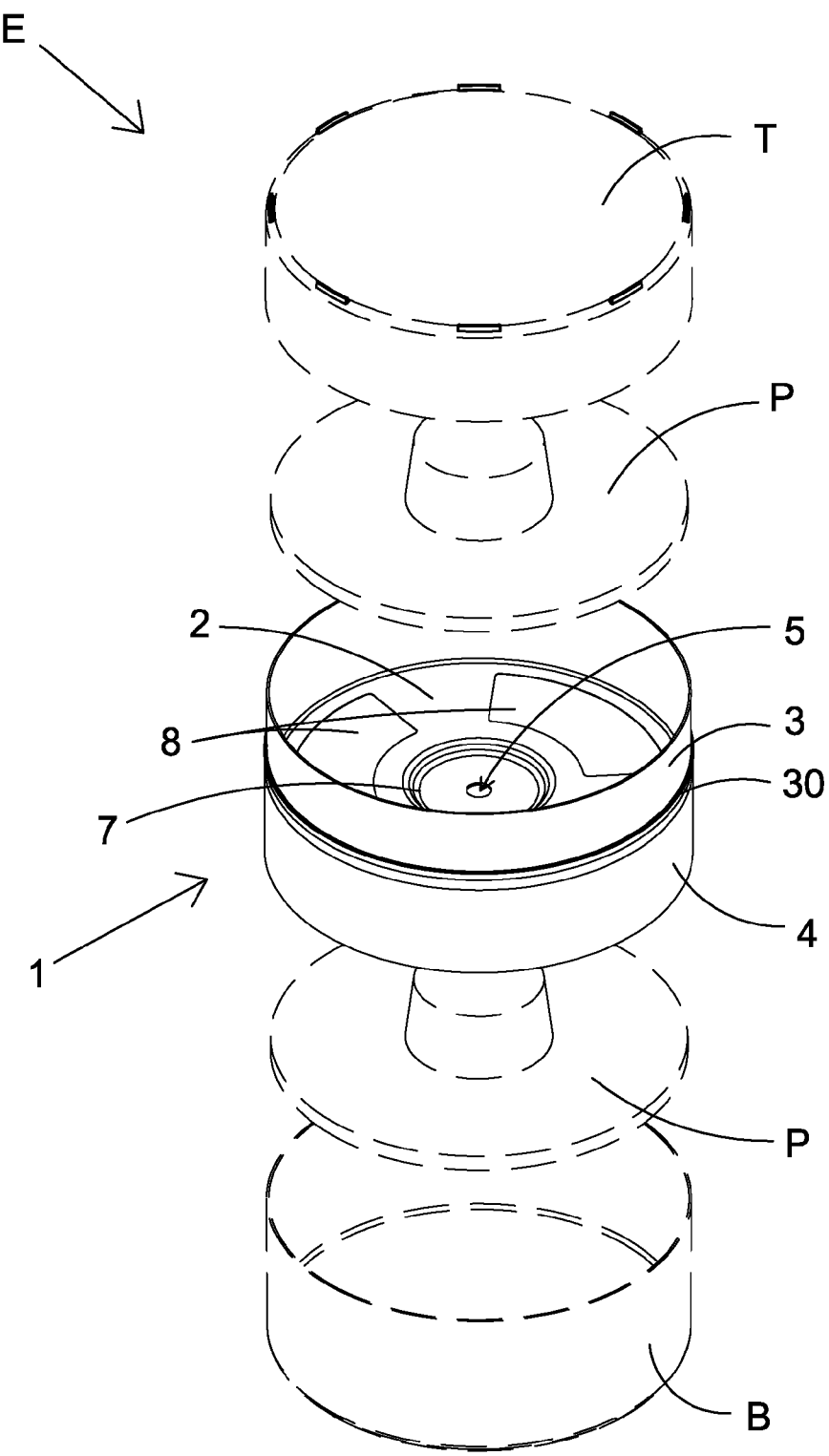
FIG. 3 illustrates an exploded view of an item of packaging (E) with the extending and separating element (1) receiving automotive parts (P)

As represented by FIGS. 1, 2 and 3 attached, the extending and separating element (1) is formed of an intermediary disk (2), which separates a first ring projection (3) from a second ring projection (4). Thus, the aforesaid extending and separating element (1) is intended to be connectable between a cover (T) and a base (B) of an item of packaging (E), to separate parts (P) arranged inside the aforesaid packaging (E).

The ring projections (3 and 4) are positioned in the peripheral region (20) of the aforesaid intermediary disk (2), so that such ring projections (3 and 4) are arranged one against the other. Thus, as illustrated by FIG. 2, the crossways section of the aforesaid extending and separating element (1) has a format substantially in "H".

Also, the first ring projection (3) is endowed with a first support region (30), such as a shoulder, while the second ring projection (4) is endowed with a second support region (40), such as a radial lowering. Preferably, as illustrated by FIG. 4A, the first support region (30) is arranged on the outer surface (31) of the first ring projection (3), while the aforesaid second support region (40) is arranged on the inner surface (41) of the second ring projection (4).

As illustrated by FIGS. 5 and 6, the aforesaid intermediary disk (2) is endowed with at least one hole (5) and one or more structural ribs (6), which are responsible for granting greater structural resistance to the intermediary disk (2) of the extending and separating element (1). Furthermore, the intermediary disk (2) includes a central lowering (7), which defines a structural step in the extending and separating element (1), providing even greater structural resistance to the disk (2). Thus, such element (1) grants greater structural resistance to the packaging (E).

Moreover, as illustrated by FIG. 5, the aforesaid intermediary disk (2) includes at least one identification region (8), responsible for containing various information, such as features of the part (P), of in the extending and separating element (1) and/or the packaging (E), as well as its instructions for use, etc.

In a preferable example of application of the present invention, as illustrated by FIG. 2, the aforesaid extending and separating element (1) is designed to be fitted between the cover (T) and the base (B) of the packaging (E), so that the first ring projection (3) is positioned inside the wall (T1) of the cover (T), while the second ring projection (4) is positioned outside the wall (B1) of the base (B). Thus, the end (T2) of the aforesaid wall (T1) is supported on the first support region (30) of the first ring projection (3), while the second support region (40) of the second ring projection (4) is supported on the end (B2) of the aforesaid wall (B1).

However, it shall be understood that the aforesaid extending and separating element (1) can be designed to be fitted between the cover (T) and the base (B) of the packaging (E), so that the first ring projection (3) is positioned inside the wall (B1) of the base (B), while the second ring projection (4) is positioned outside the wall (T1) of the cover (T), without deviating from the scope of protection of the present invention.

It shall also be understood that such extending and separating element (1) can be designed so that both the ring projections (2 and 3) are positioned inside the aforesaid cover (T) and base (B), or so that both the ring projections (2 and 3) are positioned outside the aforesaid cover (T) and base (B), without deviating from the scope of protection of the present invention.

Thus, to facilitate the undoing between the aforesaid extending and separating element (1) and the aforesaid cover (T) and/or base (B) of the packaging (E), the hole (5) of the intermediary disk (2) acts as a means to relieve the air pressure inside the space delimited by the element (1) in association with the cover (T) or with the base (B).

The technical person will quickly perceive, from the description of the designs represented, several ways or executing the invention without leaving the scope of the claims attached.

The invention claimed is:

1. An Extending and Separating Element for Packaging (E) including a base (B) and a cover (T), comprising:
    an intermediary disk (2);
    a first ring projection (3) arranged on a first side of the intermediary disk (2) along a peripheral region (20) of the intermediary disk (2);
    a second ring projection (4) arranged on a second side of the intermediary disk (2) along the peripheral region (20) of the intermediary disk (2), the second side is opposite to the first side;
    wherein the first ring projection (3) includes an upper portion and a lower portion, the lower portion connects to the first side of the intermediary disk (2) directly and has a thickness greater than a thickness of the upper portion, thus a step structure is formed between the upper portion and the lower portion on an inner surface of the first ring projection (3) or on an outer surface of the first ring projection (3);
    wherein the second ring projection (4) includes an upper portion and a lower portion, the lower portion connects to the first side of the intermediary disk (2) directly and has a thickness greater than a thickness of the upper portion, thus a step structure is formed between the upper portion and the lower portion on an inner surface of the second ring projection (4) or on an outer surface of the second ring projection (4);
    wherein the intermediary disk (2) has a central portion convex from the second side of the intermediary disk (2), and at least one opening is formed on the central portion of the intermediary disk (2);
    wherein the lower portion of the second ring projection (4) has an inner surface and a plurality of structural ribs (6) are formed on the inner surface of the lower portion of the second ring projection (4), and the plurality of structural ribs (6) are also directly connected to the second side of the intermediary disk (2) along the peripheral region (20).

2. The Extending and Separating Element for Packaging (E) according to claim 1, wherein intermediary disk (2) has at least one identification region (8) formed on the first side of the intermediary disk (2) for storing materials.

* * * * *